(12) United States Patent
Miller et al.

(10) Patent No.: US 6,405,303 B1
(45) Date of Patent: Jun. 11, 2002

(54) MASSIVELY PARALLEL DECODING AND EXECUTION OF VARIABLE-LENGTH INSTRUCTIONS

(75) Inventors: Paul K. Miller, Dripping Springs; Gerald D. Zuraski, Jr., Austin, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/388,211

(22) Filed: Aug. 31, 1999

(51) Int. Cl.[7] .................................................. G06F 9/38
(52) U.S. Cl. ....................... 712/210; 712/204; 712/213
(58) Field of Search .............................. 712/210, 204, 712/213, 23

(56) References Cited

U.S. PATENT DOCUMENTS

| | | | | |
|---|---|---|---|---|
| 5,109,495 A | * | 4/1992 | Fite et al. ..................... | 712/207 |
| 5,586,277 A | | 12/1996 | Brown et al. ................. | 712/210 |
| 5,619,666 A | | 4/1997 | Coon et al. ................... | 712/208 |
| 5,630,083 A | | 5/1997 | Carbine et al. ............... | 712/212 |
| 5,809,273 A | | 9/1998 | Favor et al. .................. | 712/210 |
| 5,819,059 A | | 10/1998 | Tran ............................ | 712/213 |
| 5,822,558 A | | 10/1998 | Tran ............................ | 712/213 |
| 6,049,863 A | * | 4/2000 | Tran et al. .................... | 712/204 |
| 6,175,909 B1 | * | 1/2001 | McBride ...................... | 712/204 |
| 6,263,423 B1 | * | 7/2001 | Coon et al. ................... | 712/204 |
| 6,308,257 B1 | * | 10/2001 | Theogarajan et al. ........ | 711/209 |
| 6,311,261 B1 | * | 10/2001 | Chamdani et al. ............ | 712/23 |

FOREIGN PATENT DOCUMENTS

EP     0 417 013     3/1991

OTHER PUBLICATIONS

Gwennap, "Intel, HP Make EPIC Disclosure," Microprocessor Report, vol. 11, No. 14, Oct. 1997, 2 pages.
Gwennap, "First Merced Patent Surfaces," Microprocessor Report, Mar. 1997, 3 pages.
Christy, "IA–64 and Merced—What and Why," Cahners Electronics Group, 1997, 5 pages.

* cited by examiner

*Primary Examiner*—Eric Coleman
(74) *Attorney, Agent, or Firm*—Conley, Rose & Tayon, PC; B Noël Kivlin

(57) ABSTRACT

A microprocessor configured to decode a plurality of instruction bytes in parallel is disclosed. The microprocessor may comprise a plurality of single-byte decoder/execution units that are configured to receive instruction bytes and cross-talk to determine instruction boundaries and instruction field boundaries. Once and instruction has been identified, a determination is made as to whether or not the instruction is a simple instruction. Simple instructions are executed within the decoder/execution units, while complex instructions are forwarded to full-fledged functional units. A computer system and method for predecoding instructions are also disclosed.

20 Claims, 9 Drawing Sheets

MASSIVELY PARALLEL DECODING AND EXECUTION OF VARIABLE-LENGTH INSTRUCTIONS

BACKGROUND OF THE INVENTION

1. Field of the Invention

This invention relates to microprocessors configured to execute variable-length instruction sets, and in particular, to instruction decoders configured to decode and execute multiple bytes of instruction data in parallel.

2. Description of the Relevant Art

The number of software applications written for the x86 instruction set is immense. As a result, despite the introduction of newer and more advanced instruction sets, microprocessor designers have continued to design microprocessors capable of executing the x86 instruction set.

The x86 instruction set is relatively complex and is characterized by a plurality of variable-length instructions. This is in stark contrast with many RISC (reduced instruction set computer) formats which are fixed-length. A generic format illustrative of the x86 instruction set is shown in FIG. 1. As the figure illustrates, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more of the optional prefix bytes 102. For example, one of prefix bytes 102 may be used to override the default segment used in memory addressing or to instruct the processor to repeat a string operation a number of times.

Two prefix bytes are of particular importance. A prefix byte of 66(hex) represents the OPSIZ prefix, which reverses the default the operand size for an instruction. A prefix byte of 67(hex) represents the ADRSIZ prefix, which reverses the default the address size for an instruction. The default operand and address size of an instruction is determined by a bit (i.e., the D-bit or default bit) in the segment descriptor. If the default bit is set, then the default address and operand size is 32-bits. A prefix of 66(hex) or 67(hex) will override a set default bit, thereby allowing the instruction following the prefix to use a 16-bit opcode or address, respectively. Similarly, if the default bit is not set, then the default address and operand size is 16-bits. A prefix of 66(hex) or 67(hex) will override a set default bit, thereby allowing the instruction following the prefix to use a 32-bit opcode or address, respectively. Thus, not only does the length of an x86 instruction depend upon how many prefix bytes precede the instruction, but also upon the presence of prefixes 66(hex), 67(hex), and the value of the default bit in the instruction's segment descriptor.

The opcode field 104 follows prefix bytes 102, if present, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field within SIB byte 108 specifies which register contains the base value for the address calculation, and an index field within SIB byte 108 specifies which register contains the index value. A scale field within SIB byte 108 specifies the power of two by which the index value will be multiplied before being added, along with any displacement, to the base value. The next instruction field is a displacement field 110, which is optional and may be from one to four bytes in length. Displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86-compatible microprocessors. In particular, the variable length of x86 instructions, the nature of the prefix bytes, and reliance upon the segment descriptor makes scanning, aligning, and decoding instructions difficult. Scanning refers to reading a group of instruction bytes (either from an instruction cache within the microprocessor or from an external memory) and determining the boundaries of instructions contained therein. Alignment refers to the process of masking off the undesired instruction bytes and shifting the desired instruction so that the first bit of the desired instruction is in the desired position. Decoding instructions typically involves identifying each field within a particular instruction, e.g., the prefix, opcode and operand fields. Decoding typically takes place after the instruction has been fetched from the instruction cache, scanned, and aligned.

One method for determining the boundaries of instructions involves generating a number of predecode bits for each instruction byte read from main memory. The process of generating these predecode bits is referred to as "predecoding". The predecode bits provide information about the instruction byte they are associated with. For example, an asserted predecode start bit indicates that the associated instruction byte is the first byte of an instruction. Similarly, an asserted predecode end bit indicates that the associated instruction byte is the last byte of an instruction. Once the predecode bits for a particular instruction byte are calculated, they are stored together with the instruction byte in an instruction cache. When a "fetch" is performed, i.e., a number of instruction bytes are read from the instruction cache, the associated start and end bits are also read. The start and end bits may then be used to generate valid masks for the individual instructions with the fetch. A valid mask is a series of bits in which each bit corresponds to a particular instruction byte. Valid mask bits associated with the first byte of an instruction, the last byte of the instruction, and all bytes in between the first and last bytes of the instruction are asserted. All other valid mask bits are not asserted.

Turning now to FIG. 2, an exemplary valid mask is shown. The figure illustrates a portion of a fetch block 120 and its associated start and end bits 122 and 124. Assuming a valid mask 126 for instruction B 128 is to be generated, start and end bits 122 and 124 would be used to generate the mask. Valid mask 126 could then be used to mask off all bytes within fetch 120 that are not part of instruction B 128. Once the boundaries of an instruction have been determined, each instruction is typically aligned and sent to a decoder.

Although the predecoding technique described above has been largely successful, in some cases almost fifty percent of the available storage space within the instruction cache array is allocated for the predecode bits. This accordingly limits the amount of storage within the instruction cache for instruction bytes and/or increases the cost of the processor due to increased die size. In addition, the process of aligning each individual instruction for decoding may further increase the overall time to execution for instructions. For these reasons, a method and apparatus for rapidly decoding instructions without the use of extensive predecode information is needed.

SUMMARY OF THE INVENTION

The problems outlined above may in part be solved by a microprocessor capable of decoding a plurality of instructions in parallel. This may be accomplished through the use of multiple combination decoder/execution units configured to operate in parallel. Advantageously, wide parallel decoding of x86 instructions may improve instruction throughput while reducing or eliminating the need for devoting large portions of the instruction cache for predecode information.

In one embodiment, a microprocessor configured to decode multiple instructions in parallel may include an instruction cache, a plurality of parallel decode units, and a bus coupling the decode units. The instruction cache is configured to receive and store instruction bytes from a main system memory. Each of the plurality of decode units are configured to receive at least one instruction byte from the instruction cache during a particular clock cycle. Using the bus coupling the decode units, the decode units are each configured to cross talk to identify the boundaries of instructions formed by the instruction bytes. The decode units are configured to detect and execute simple instructions formed by the instruction bytes. The decode units may also be configured to forward complex instructions to a set of dedicated functional units for execution. The decode units may also be configured to allocate an entry in a reorder buffer for each instruction that is decoded (regardless of whether the decoded instruction is simple or complex). In some embodiments a simple instruction may be an instruction that does not have a dependency upon any instructions that have not yet executed. Similarly, in some embodiments simple instructions may be further restricted to instructions that do not alter the microprocessor's state (e.g., control and/or status words).

A method for predecoding instructions having varying address and operand sizes is also contemplated. In one embodiment, the method includes reading a plurality of instruction bytes from an instruction cache and routing each instruction byte to one of a plurality of decoders. The decoders detect instruction boundaries and execute simple instructions. Complex instructions are forwarded to reservation stations for eventual execution by functional units.

A computer system capable of rapidly predecoding a large number of instructions bytes is also contemplated. The computer system may comprise a microprocessor as described above, a CPU bus coupled to the microprocessor; and a communications device (e.g., a modem) coupled to the microprocessor via the CPU bus. In one embodiment, the computer system may have multiple microprocessors coupled to each other via the CPU bus.

BRIEF DESCRIPTION OF THE DRAWINGS

Other objects and advantages of the invention will become apparent upon reading the following detailed description and upon reference to the accompanying drawings in which.

Figure 1:
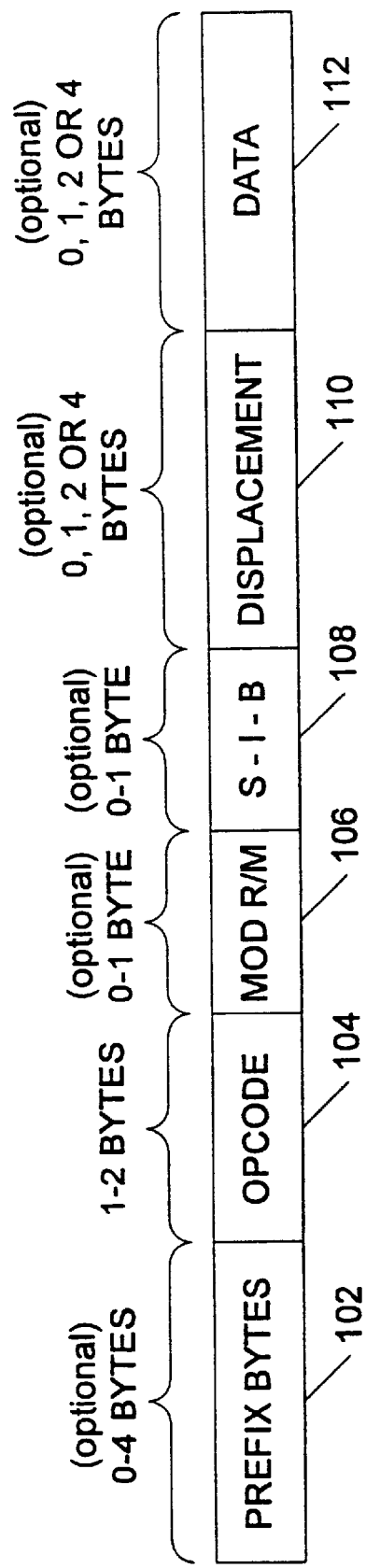
FIG. 1 is a block diagram illustrating the generic format of the x86 instruction set.
Figure 2:
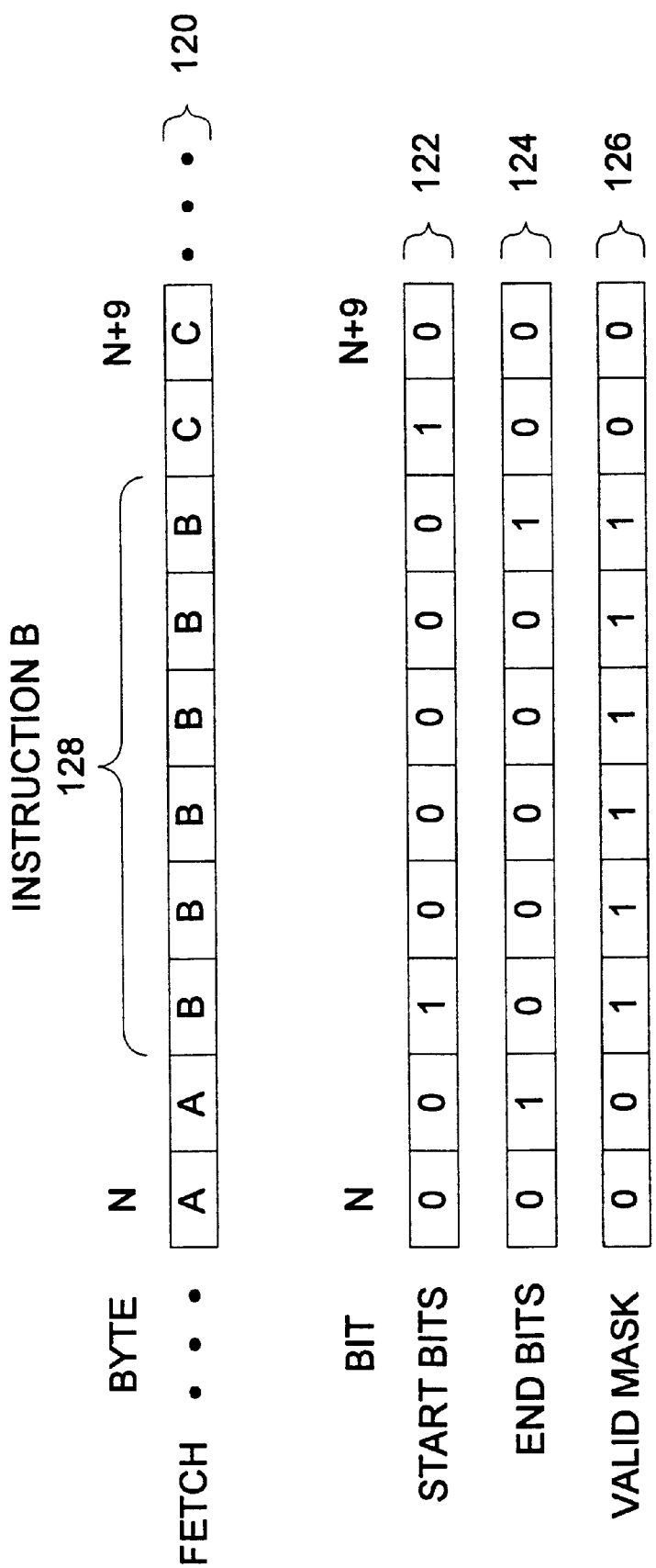
FIG. 2 is a block diagram illustrating one embodiment of a valid mask.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Figure 3:
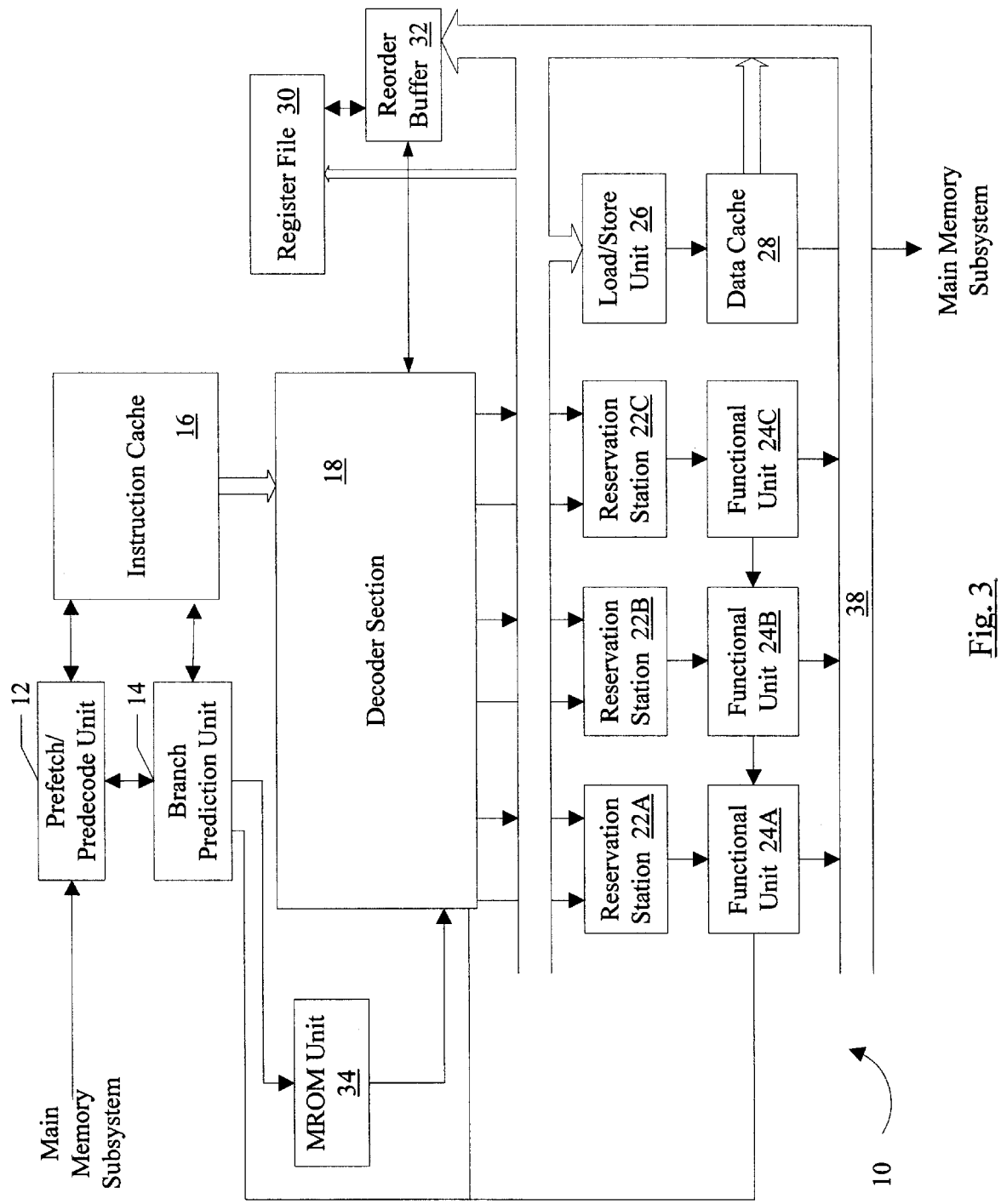
FIG. 3 is a block diagram illustrating one embodiment of a microprocessor configured to rapidly decode large numbers of instruction bytes in parallel.

Turning now to FIG. 3, a block diagram of one embodiment of a microprocessor 10 that is configured to rapidly predecode instruction bytes in parallel is shown. In this embodiment, microprocessor 10 includes a prefetch unit 12, a branch prediction unit 14, and an instruction cache 16. Decode section 18 is coupled between instruction cache 16 and reservation stations 22A–C. A microcode read-only memory (MROM) unit 34 is also coupled to decode section 18. Reservations stations 22A–C are coupled to a corresponding number of functional units 24A–C, and load/store unit 26 is coupled to a data cache 28. Finally, a result bus 38 couples functional units 24A–C and data cache 28 to reorder buffer 32, register/future file 30, load/store unit 26, and reservations stations 22A–C.

Generally speaking, instruction cache 16 is a high speed cache memory provided to temporarily store instructions before they are fetched and conveyed to decode section 18. In one embodiment, instruction cache 16 is configured to store up to 32 kilobytes of instruction code. Instruction cache 16 may be organized as an array of 16 byte storage locations (also referred to as cache lines). During operation, instruction bytes are provided to instruction cache 16 by prefetching instruction bytes from a main memory (not shown) through prefetch unit 12. It is noted that instruction cache 16 may be implemented in set-associative, fully-associative, or direct-mapped configurations.

As noted above, prefetch unit 12 prefetches instruction bytes from the main memory for storage within instruction cache 16. In one embodiment, prefetch unit 12 is configured receive 64-bit wide bursts of code from the main memory. It is understood that a variety of specific code prefetching techniques and algorithms may be employed by prefetch/predecode unit 12. Once an instruction has been prefetched, it is conveyed to instruction cache 16 for storage.

When an instruction is fetched, the corresponding cache line in instruction cache 16 is output. In one embodiment, instruction cache 16 may be configured to output one cache line per clock cycle. Decode section 18 receives the instructions and begins the process of aligning and decoding the instructions. As part of decoding, decode section 18 may perform one or more of the following: (i) execute simple instructions; (ii) translate more complex instructions into RISC-like instructions (via MROM unit 34), (iii) reformat instructions into a standard (e.g., fixed length) internal format for execution; and route unexecuted instructions to reservation stations 22A–C for execution.

While decode section 18 is receiving instructions from instruction cache 16, reorder buffer 32 may be configured to issue each instruction a reorder buffer tag which serves to identify each instruction's relative position in program order. This may advantageously allow instructions to execute out of order. The reorder buffer tags follow each outstanding instruction through decode section 18, reservation stations 22A–C, and functional units 24A–C. Reorder buffer 32 may also reserve a storage location for the result of each instruction. When an instruction completes execution, its results and reorder buffer tag are output by functional units 24A–C onto result bus 38. Reorder buffer 32 monitors result bus 38 and stores the results in the corresponding reserved storage location. Each clock cycle, reorder buffer 32 may also retire one or more instructions. An instruction is retired by copying its results to the architectural register file 30, thereby updating the architectural state of microprocessor 10. Advantageously, reorder buffer 32 operates to keep track of the original program sequence for register read and write operations, implements register renaming, allows for speculative instruction execution and branch misprediction recovery, and facilitates precise exceptions.

Reservation stations 22A–C act as buffers for their corresponding functional units 24A–C by storing instructions until they are executed. The instructions wait in reservation stations 22A–C or load/store unit 26 until the corresponding functional unit's first execution pipeline stage is available to accept a new instruction. At that point, the instructions may enter functional units 24A–C for execution. In one embodiment, each functional unit 24A–C is configured to perform integer arithmetic operations of addition and subtraction, as well as shifts, rotates, logical operations, and branch operations. It is noted that a floating point unit (not shown) may also be employed to accommodate floating point and other types of operations (e.g., MMX instructions).

Register file 30 comprises two sets of registers. One set comprises the x86 architectural registers, including eight 32-bit real registers (i.e., typically referred to as EAX, EBX, ECX, EDX, EBP, ESI, EDI and ESP). The second set comprises registers for storing the most recent speculative set of values for each architectural register. This "future file" of registers provides a convenient place from which to forward speculative register values to pending instructions (e.g., to reservation stations 22A–C). If reorder buffer 32 has a result storage location reserved for a value that will update the desired register, the operand value (or tag thereto) is provided from reorder buffer 32 rather than from register file 30. If there is no location reserved for a required register in reorder buffer 32, the value is taken directly from register file 30. If the operand corresponds to a memory location, the operand value is provided from load/store unit 26.

The results of each executed instruction are stored in reorder buffer 32 until the instruction is "retired". Retiring an instruction refers to copying the instruction's results to architectural register file 30 and thereby updating the microprocessor's non-speculative architectural state. As previously noted, reorder buffer tags follow each instruction through reservation stations 22A–C and functional units 24A–C. Thus, the results may be identified and attributed to the appropriate instruction within reorder buffer 32. Once the results are received, reorder buffer 32 retires instructions in-order in a line-by-line fashion, waiting to retire a line of instructions until the following conditions are met: (1) the line is the oldest line of instructions stored within reorder buffer 32, and (2) each instruction in the line has completed execution without an exception or branch misprediction. Note that other variations of reorder buffer 32 are also possible. For example, in another embodiment reorder buffer 32 may individually retire instructions as opposed to retiring them in a line-by-line manner. Reorder buffer 32 may be implemented in a first-in-first-out configuration wherein speculative results move to the "bottom" of the buffer as they are validated and written to register file 30, thus making room for new entries at the "top" of the buffer.

In the event of a branch misprediction, decode section 18, reorder buffer 32, reservation stations 24A–C, and load/store unit 26 may be configured to flush all pending instructions occurring after the mispredicted branch instruction in program order. Furthermore, the contents of the architectural register file within register/future file 28 are copied to the future file to replace any erroneous values created by the execution of instructions along the mispredicted branch path. Branch mispredictions may be detected by functional units 32A–B, which forward the results of branch instructions to branch prediction unit 14.

Generally speaking, load/store unit 34 provides an interface between functional units 32A–C and data cache 36. In one embodiment, load/store unit 34 is configured with a load/store buffer that has eight storage locations for storing data and address information from pending loads or stores. Load/store unit 34 also performs dependency checking for load instructions against pending store instructions to ensure that data coherency is maintained. Data cache 36 is a high speed cache memory provided to temporarily store data being transferred between load/store unit 34 and the main memory subsystem. In one embodiment, data cache 36 has a capacity of storing up to 32 kilobytes of data. It is understood that data cache 36 may be implemented in a variety of sizes and specific memory configurations, including set associative, fully associative, and direct mapped configurations.

Details of Decode Section

Figure 4:
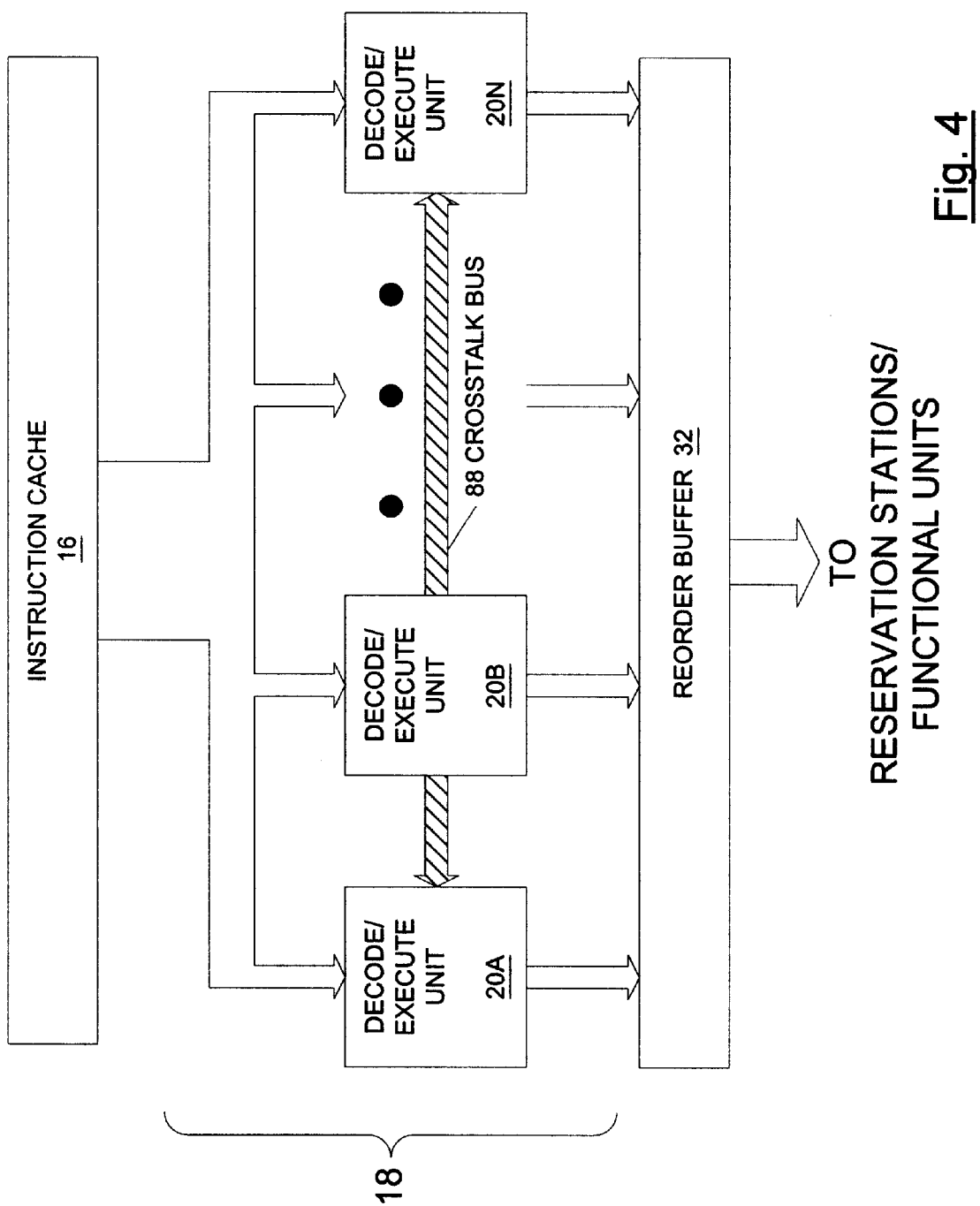
FIG. 4 is a block diagram illustrating details of one embodiment of the decode section of the microprocessor from FIG. 3.

Turning now to FIG. 4, more details of one embodiment of decode section 18 are shown. As the figure illustrates, decode section 18 includes a number of parallel decoders 20A–N. These decoders are configured to perform at least the following tasks: (i) receive instruction bytes from instruction cache 16, (ii) decode the instructions formed by the instruction bytes, (iii) allocate an entry in reorder buffer 32 for each instruction; (iii) execute any instructions that are "simple"; (v) forward the results of executed instructions to reorder buffer 32; and (vi) forward unexecuted instructions to functional units 24A–C.

As used herein, "simple" instructions are those that meet at least the following criteria: (i) they do not have any dependencies on instructions that have not completed execution; (ii) they are executable within a predetermined maximum number of clock cycles (e.g., one clock cycle); and (iii)

they do not change the default state of the microprocessor (e.g., altering the microprocessor's status word, control word, or floating point status or control words). Other criteria for decoder-executable instructions are also possible. For example, instructions that require loads from memory may be excluded in some instances. Advantageously, in some embodiments the decoder/execution units 20A–N may be limited to executing simple instructions only, thereby simplifying the hardware of decoder/execution units 20A–N.

As shown in the figure, decoder/execution units 20A–N are coupled to each other via cross-talk bus 80. Cross-talk Bus 80 allows decode/execution units 20A–N to communicate with each other to determine instruction boundaries and other information. Advantageously, by allowing decoder/execution units 20A–N to cross-talk to find instruction boundaries, the need to rely upon large amounts of predecode information may be reduced. While each specific implementation may vary, in one embodiment each decode unit 20A–N may be configured to receive a single instruction byte, and the number of decode units 20A–N may correspond to the number of instruction bytes in a cache line.

Figure 5:
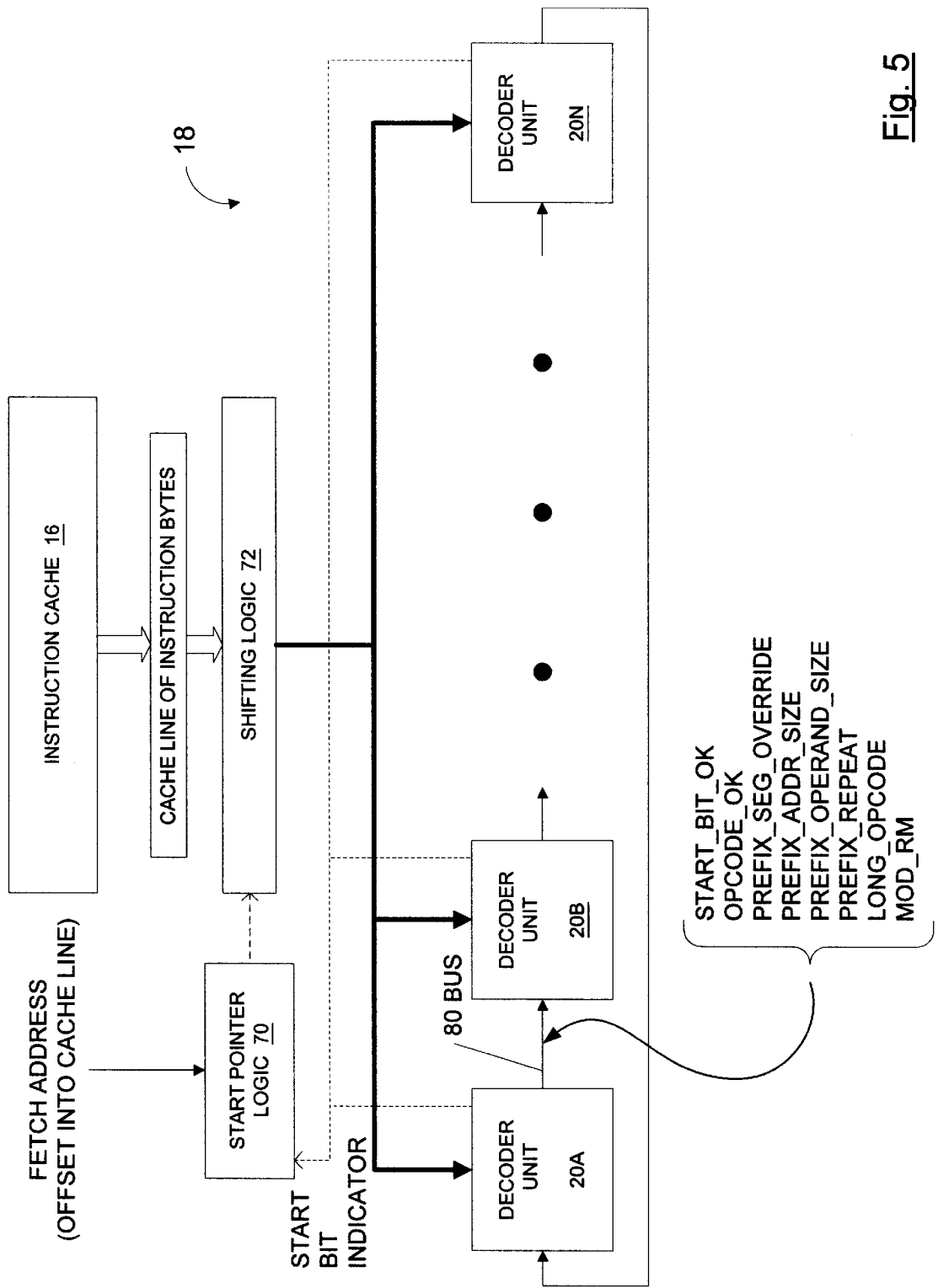
FIG. 5 is another block diagram illustrating details of one embodiment of the decode section of the microprocessor from FIG. 3.

Turning now to FIG. 5, more details of one embodiment of decode section 18 are shown. In this embodiment, the flow of instruction bytes from instruction cache 16 to decoder/execution units 20A–N is shown. The offset portion of the fetch address used to select the particular cache line in instruction cache 16 is provided to start pointer logic 70. Start pointer logic 70 is configured to use the offset portion of the fetch address to cause shifting logic 72 to shift and route the cache line to decoder/execution units 20A–N. For example, if the cache line is 16 bytes long, and the offset indicates that the next instruction begins at the fifth byte of the cache line, start pointer logic 70 may cause shifting logic 72 to shift the cache line so that decoder/execution unit 20A receives the fifth byte of the cache line, decoder/execution unit 20B receives the sixth byte, and so on. In some embodiments, start pointer logic 70 may receive information from decoder/execution units 20A–N regarding the boundaries of instructions being decoded.

Figure 6:
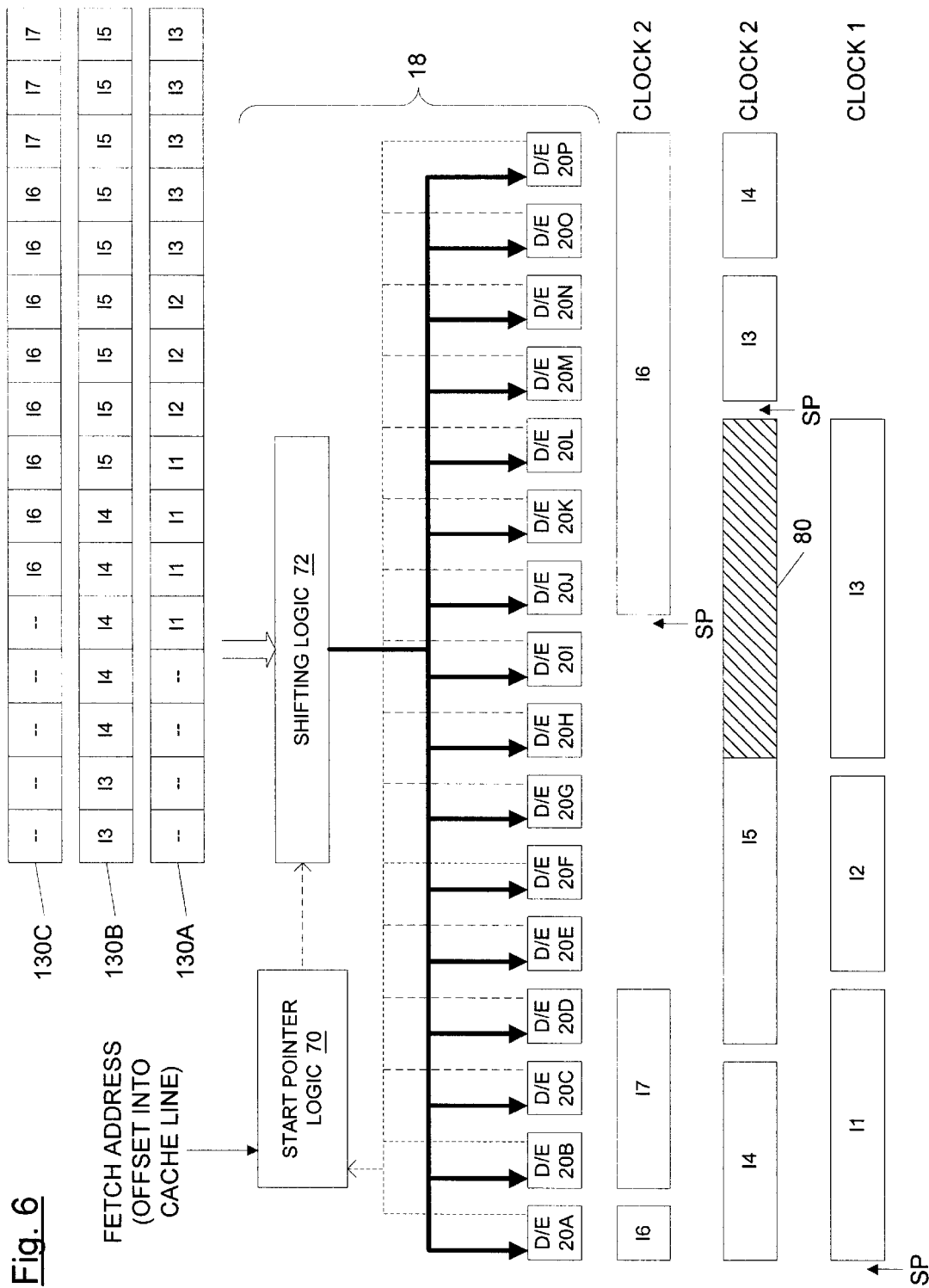
FIG. 6 is a block diagram illustrating details of one embodiment of the routing logic from the decode section from FIG. 5.

FIG. 6 shows the routing of instruction bytes in greater detail. Cache lines 130A–130C are read from instruction cache 16 at a rate of one per clock cycle. In cache line 130A, the instruction bytes labeled "I1" represent the first instruction to be executed (e.g., the target of a jump instruction). Once shifting logic 72 receives cache line 130A, start pointer logic 70 causes shifting logic 72 to shift the cache line so that the first byte of the first instruction is routed to the decoder corresponding to the start pointer (SP). In this example, the start pointer is initially pointing to decoder/execution unit 20A. Thus the first instruction is routed to decoder/execution units 20A–D, the second instruction is routed to decoder/execution units 20E–G, and the portion of the third instruction that is in cache line 130A is routed to decoder/execution units 20H–L. Once decoder/execution units 20A–L receive their instruction bytes, they are configured decode the instruction bytes, cross-talk to identity instruction boundaries, and execute simple instructions.

Once the decoder/execution units have identified the instruction boundaries, they may be configured to communicate this information back to start pointer logic 70. Start pointer logic 70 may then utilize this information to determine where the start pointer SP should point for the next clock cycle. In the example, start pointer logic 70 causes the start pointer to point to decoder/execution unit 20L for the second clock cycle. As the figure illustrates, instruction 13 crosses the boundary between cache lines 130A and 130B.

Start pointer logic 70 is configured to use the instruction boundary information received from decoder/execution units 20A–P to identify where to route the instruction bytes for cache line 130B (i.e., to align the final two bytes of instruction 13 with the first five bytes of instruction 13 left over in decoder/execution units 20A–P from the first clock cycle. The final five bytes of instruction 15 (indicated by shaded block 80), may be buffered to prevent them from overwriting the bytes of instruction 13 that carry over from the first clock cycle. Buffering may be accomplished through the use of FIFO (first-in first-out) memories at the inputs of each decoder/execution unit 20A–P. Cache line 130C may be handled in a similar manner based on the start pointer SP position after the completion of the second clock cycle. As shown in the example, the final instruction in cache line 130B may be a branch to the fifth byte in cache line 130C (i.e., instruction 16).

Figure 7:
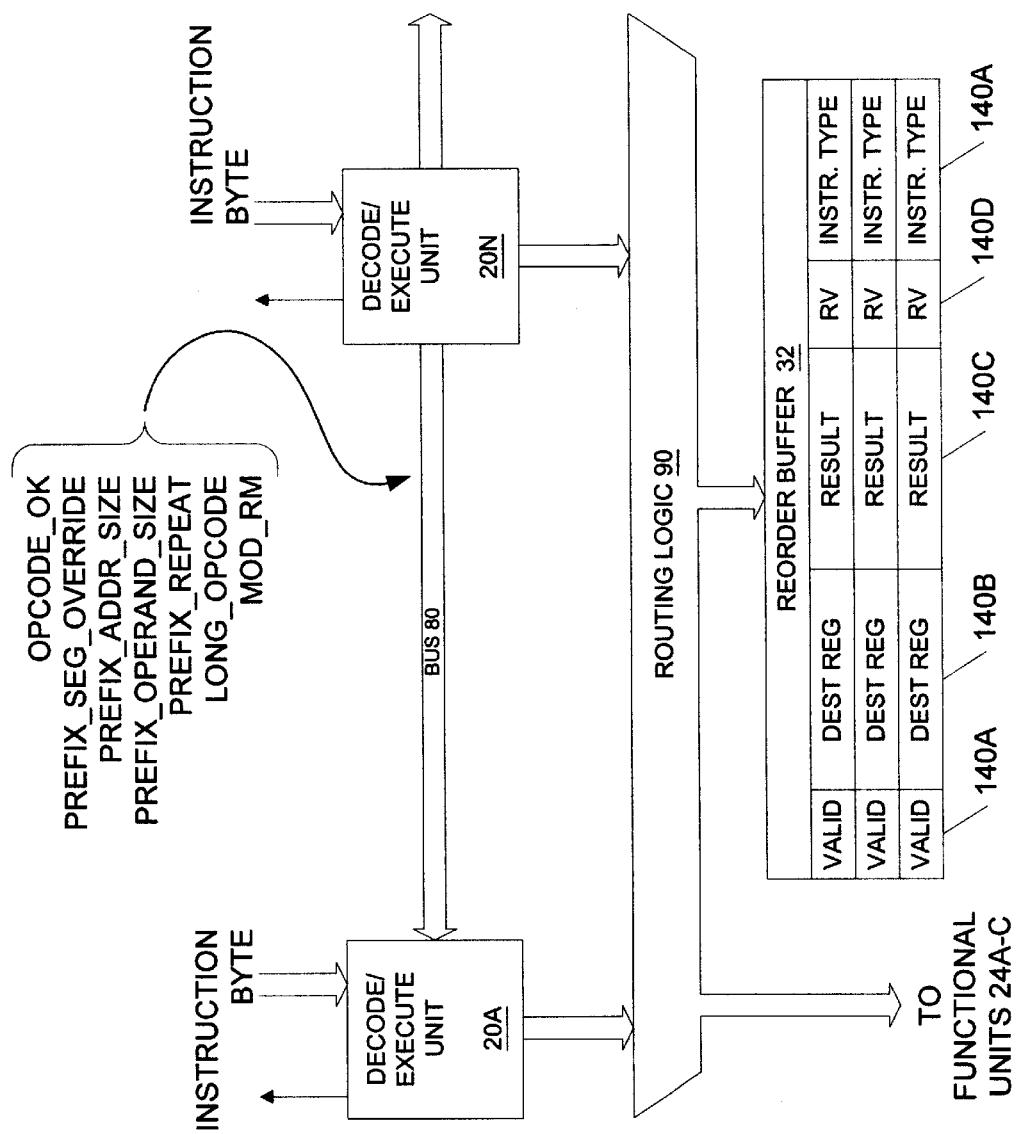
FIG. 7 is a block diagram illustrating details of one embodiment of the reorder buffer of the microprocessor from FIG. 3.

FIG. 7 illustrates details of one embodiment of reorder buffer 32, routing logic 90, and cross-talk bus 60. Each entry in reorder buffer 32 may include a valid field bit 140A, a destination field 140B, a result field 140C, a result valid bit 140D, and an instruction type field 140E. Other fields or reorder buffer configurations are also possible and contemplated. Valid field bit 140A may be used to indicated whether the particular reorder buffer entry is available to store data for a new instruction. Destination field 140B may be used to store information indicating the destination operand of the instruction. Reorder buffer 32 allows microprocessor 10 to execute instructions in an out-of-order fashion while continuing to retire instructions in program order.

While a number of different configurations are possible for cross-talk bus 60, details of one embodiment are illustrated in the figure. The version of bus 60 shown in the figure includes the following signals: PREFIX_SEG_OVERRIDE, PREFIX_ADDR_SIZE, PREFIX_OPERAND_SIZE, PREFIX_REPEAT, LONG_OPCODE, OPCODE_OK, and MOD_RM. An asserted PREFIX_SEG_OVERRIDE line indicates that a decoder/execution unit ahead of the current unit (relative to the current start pointer SP) has decoded a segment override prefix. An asserted PREFIX_ADDR_SIZE line indicates that a decoder/execution unit ahead of the current unit (relative to the current start pointer SP) has decoded an address size switching prefix. An asserted PREFIX_OPERAND_SIZE line indicates that a decoder/execution unit ahead of the current unit (relative to the current start pointer SP) has decoded an operand size switching prefix. An asserted PREFIX_REPEAT line indicates that a decoder/execution unit ahead of the current unit (relative to the current start pointer SP) has decoded a repeat prefix. An asserted LONG_OPCODE line indicates that a decoder/execution unit ahead of the current unit (relative to the current start pointer SP) has decoded a "0F" (hexadecimal) prefix byte that indicates that the opcode is two byte long. An asserted OPCODE_OK line indicates that a decoder/execution unit ahead of the current unit (relative to the current start pointer SP) has completed the decoding of a valid opcode.

Other configurations or additional lines in bus 60 are possible and contemplated. For example, an additional line may be used to indicate the presence of a decoded MMX or 3DNow!™ instruction. Additional lines may be used to indicate the boundary of certain fields within each instruction. For example, once a decode/execution unit has decoded the opcode of an instruction, the decode unit may assert certain lines within bus 60 that indicate where the address and immediate data fields (if any) are located. Similarly, once a decoder/execution unit has completed decoding an instruction's opcode and has determined where that instruction ends, the decoder/execution unit may be configured to communicate with the decoder/execution unit receiving the last byte for the particular instruction. The decoder/execution unit receiving the last byte may in turn convey a cleared OPCODE_OK line to the next decoder/execution unit in the series to indicate that the next decoder/execution unit should examine its instruction byte to determine whether the instruction byte is a prefix byte or an opcode (as opposed to a data byte or some other type of byte). This process may be repeated for each instruction within cache line until the start pointer is reached. The completion of processing for instructions that straddle cache line boundaries may be deferred until the next clock cycle.

Method for Decoding Instruction Bytes

Figure 8:
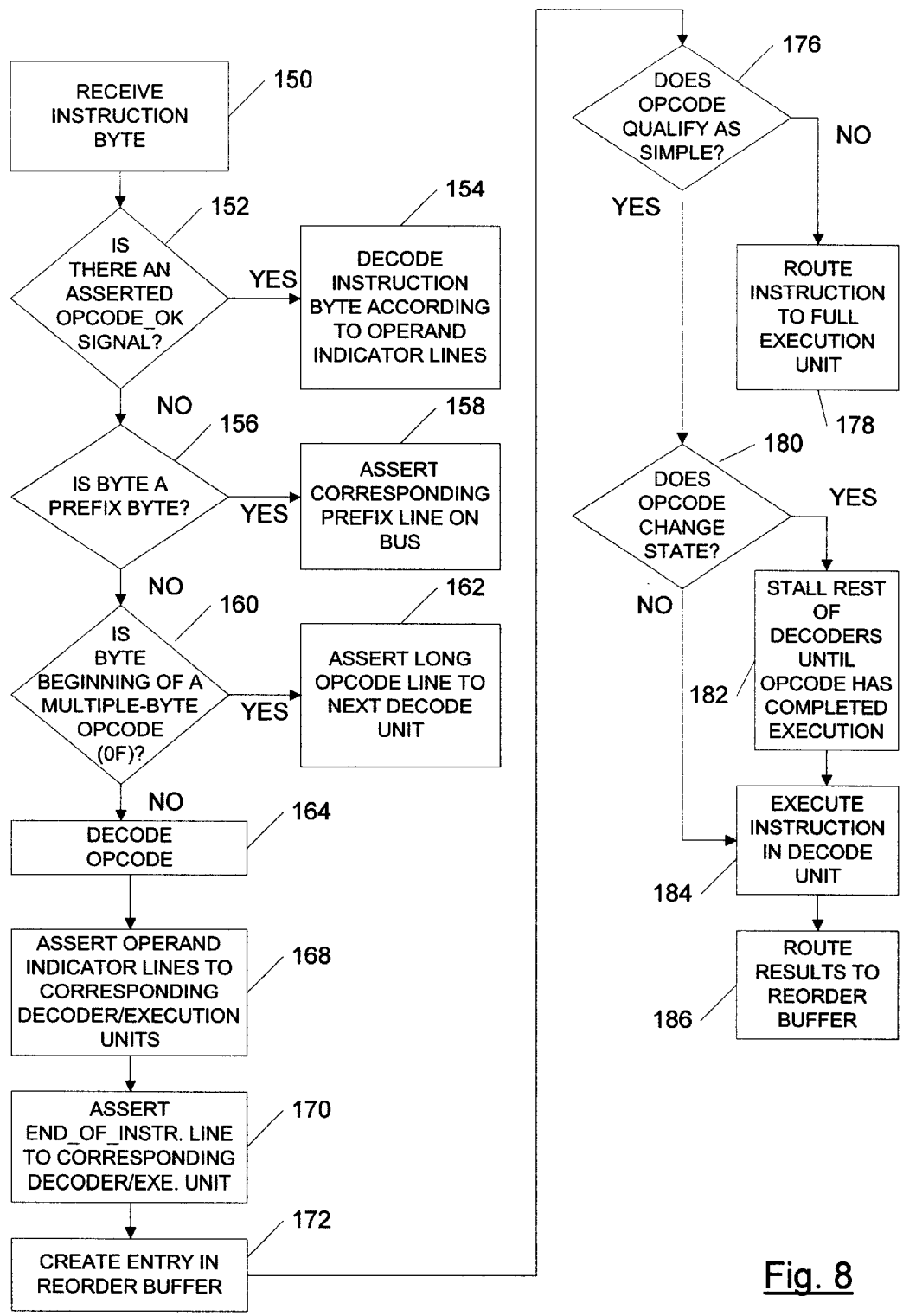
FIG. 8 is a flowchart illustrating details of one embodiment of a method for rapidly decoding and executing instruction bytes in parallel.

FIG. 8 is a flowchart of one embodiment of a method for decoding instruction bytes in parallel without reliance on predecode data. First, the decoder/execution unit receives the instruction byte or bytes (step 150). Next, the decoder/execution unit determines whether or not it has received an asserted OPCODE_OK signal from another decoder that is ahead of the current decoder or "upstream" relative to the current decoder (step 152). A decoder is ahead/upstream relative to another decoder if the decoder is decoding an instruction byte occurring before the instruction byte being executed by the other decoder. If there is an asserted OPCODE_OK signal, then the decoder is configured to decode the instruction byte according to one or more operand boundary indicator lines received by the decoder (step 154). Operand boundary indicator lines are described in greater detail below in connection with step 168.

If the decoder has not received an asserted OPCODE_OK bit, then an upstream decoder has not decoded the opcode corresponding to the instruction byte received by the decoder. In this case, the decoder examines the instruction byte to determine if the instruction byte is a prefix byte (step 156). If the instruction byte is a prefix byte, the decoder may be configured to assert a corresponding signal on the cross-talk bus (step 158). If not, the decoder is configured to determine if the instruction byte is the first byte of a multi-byte instruction, e.g., a hexadecimal 0F (step 160). If this is true, the decoder is configured to assert the LONG_OPCODE signal on the cross-talk bus to the next decoder in the series (step 162).

If the instruction byte is not the beginning of a multiple-byte instruction, then the instruction byte is decoded as the opcode byte of the instruction (step 164). If the decoder has received an asserted LONG_OPCODE signal from the neighboring upstream decoder, then the decoder is configured to decode the instruction byte as part of a multi-byte opcode. Once the opcode has been decoded, the decoder may be configured to assert operand indicator lines to corresponding downstream decoders (step 168). For example, if there are no asserted prefix indicator signals and the opcode indicates that the instruction is a RET (return) instruction with a one byte opcode of C2 (hex) and a sixteen bit displacement, then the decoder would signal the next two downstream decoders that they are decoding the first and last bytes of the instruction's displacement. Similarly, the decoder may also convey an indicator to the second downstream decoder causing that decoder to pass a deasserted OPCODE_OK signal to the third downstream decoder to indicate to the third downstream decoder that a new instruction is beginning (step 170).

The decoder that receives the last byte of the opcode of the instruction may also be configured to create an entry in the reorder buffer corresponding to the instruction (step 172). As previously noted, the entry in the reorder buffer may include a number of different fields, including one for the instruction results and one for an instruction type indicator. Once the instruction's opcode has been identified, the decoder may be configured to determine whether or not the opcode qualifies as a "simple" instruction (step 176). If the instruction does not qualify as a simple instruction, the decoder then routes the instruction to one of the full-fledged functional units 24A–C in the microprocessor for execution (step 178). As used herein, a "simple" opcode or instruction is one that may be executed by the decoder/execution units. As previously noted, for efficiency each decoder may be configured to execute only a subset of all possible instructions. While each embodiment may vary in its implementation, an example of a simple instruction is one that may be executed in a single clock cycle and/or does not have any dependencies that prevent it from executing. In some embodiments, the decoders may be configured to detect simple instructions that change the microprocessor's internal state (step 180). For example, an instruction with a prefix that changes the microprocessor's floating point control word. In the event such an instruction is detected, the decoder/execution units may be configured to stall any further decoding by decoder/execution units executing instructions occurring after the state-changing instruction until the state-changing instruction has completed execution (step 182).

Once the instruction is executed by the decoder/execution units (step 184), the results are routed to the reorder buffer (step 186). While the decoder/execution units may execute some instructions out of order relative to older instructions further down the instruction processing pipeline (e.g., in the full-fledged functional units 24A–C), the reorder buffer ensures that instructions are retired according to their program order.

Other embodiments are possible and contemplated. U.S. patent application Ser. No. 09/184,750 filed on Nov. 2, 1998, now U.S. Pat. No. 6,260,134, entitled "Improved Instruction Decoding Using a Parallel Decode Algorithm", by Zuraski, et al., discloses additional information regarding parallel decoding and is hereby incorporated by reference in its entirety.

Exemplary Computer System

Figure 9:
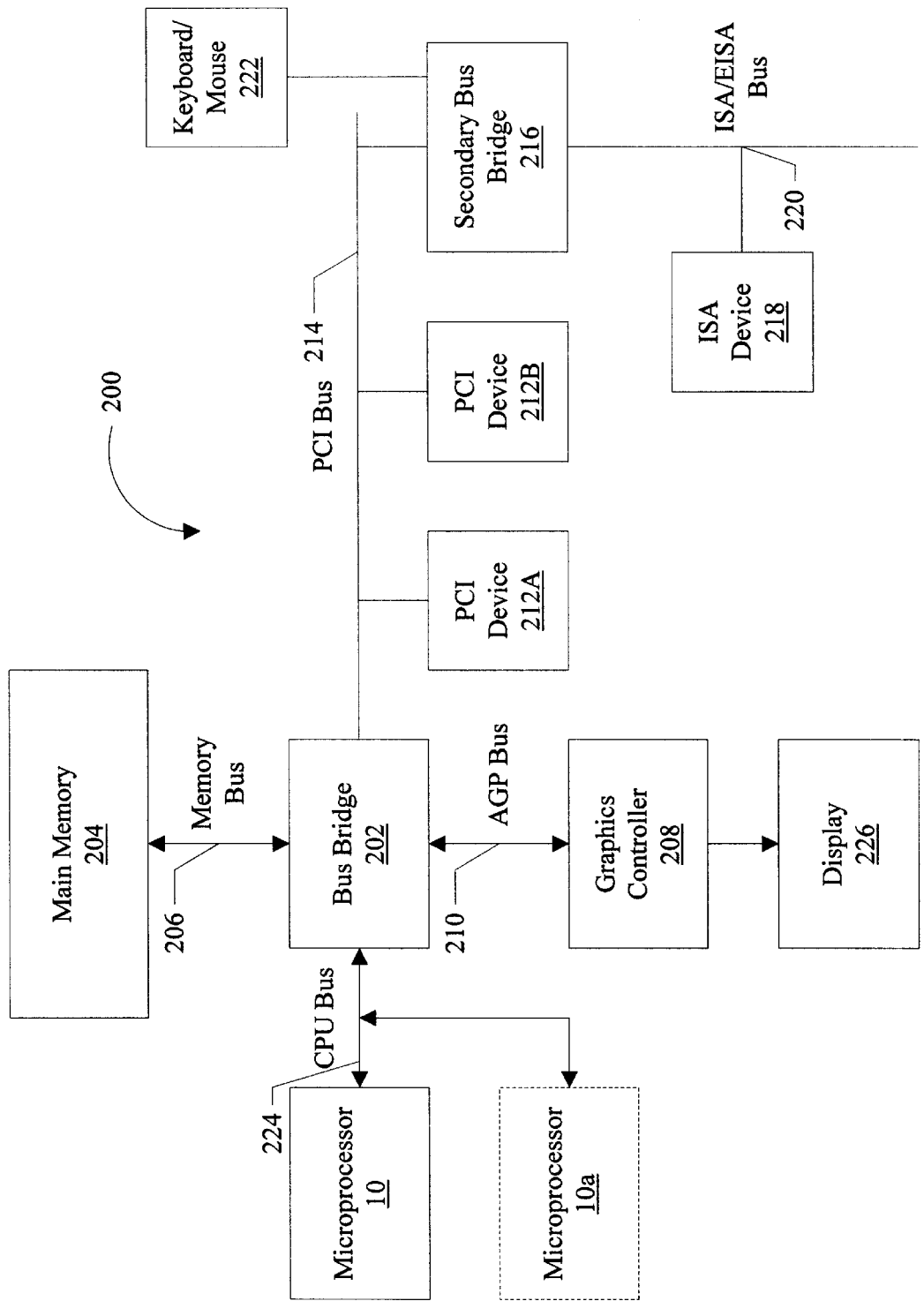
FIG. 9 is a block diagram of one embodiment of a computer system configured to use the microprocessor from FIG. 3.

Turning now to FIG. 9, a block diagram of one embodiment of a computer system 200 configured to use microprocessor 10 is disclosed. Computer system 200 is coupled to a variety of system components through a bus bridge 202 as shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports (e.g., a modem port for connecting a modem), as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10. Microprocessor 10a may share CPU bus 224 with microprocessor 10 (as shown in FIG. 5) or may be connected to bus bridge 202 via an independent bus.

A method and apparatus for decoding variable-length instructions in parallel has been disclosed. While the invention has been particularly shown and described with reference to preferred embodiments thereof, it will be understood by those skilled in the art that various changes in form and details may be made therein without departing form the spirit and scope of the invention.

What is claimed is:

1. A microprocessor comprising:
   an instruction cache configured to receive and store instruction bytes;
   a plurality of decode units, wherein each decode unit is configured to receive at least one instruction byte from the instruction cache; and
   a bus coupling the decode units, wherein the decode units are each configured to cross talk to identify the boundaries of instructions formed by the instruction bytes, and wherein the decode units are configured to detect and execute simple instructions.

2. The microprocessor as recited in claim 1, further comprising a plurality of functional units, wherein the plurality of decode units are configured to forward complex instructions to the functional units for execution.

3. The microprocessor as recited in claim 1, further comprising a reorder buffer, wherein the decode units are configured to allocate an entry in the reorder buffer for each instruction that is decoded.

4. The microprocessor as recited in claim 3, wherein each entry in the reorder buffer includes at least a valid field and a result field.

5. The microprocessor as recited in claim 1, wherein simple instructions are instructions that do not have any dependencies on instructions that have not yet executed.

6. The microprocessor as recited in claim 1, wherein simple instructions are instructions that do not alter the microprocessor's control words.

7. The microprocessor as recited in claim 1, wherein simple instructions are instructions that may be executed by the plurality of decoders in a single clock cycle.

8. The microprocessor as recited in claim 1, wherein simple instructions are instructions that do not alter the microprocessor's state.

9. The microprocessor as recited in claim 1, wherein each decode unit included a buffer for storing instruction bytes received from the instruction cache.

10. The microprocessor as recited in claim 1, further comprising shifting logic coupled between the instruction cache and the plurality of decode units, wherein the shifting logic is configured to shift the instruction bytes to align the first instruction byte according to a start pointer.

11. The microprocessor as recited in claim 1, further comprising start pointer logic coupled to the shifting logic, wherein the start pointer logic is configured to receive instruction boundary information from each decoder, and wherein the start pointer logic is configured to maintain and update the start pointer used by the shifting logic based on the instruction boundary information.

12. The microprocessor as recited in claim 1, wherein the bus includes one or more signal lines for carrying signals indicative of one or more of the following: the presence of a segment override prefix, the presence of an address size override prefix, the presence of an operand size override prefix, and the presence of a repeat prefix.

13. The microprocessor as recited in claim 1, wherein the bus includes a signal line for conveying a signal indicative of the presence of a multiple-byte opcode.

14. The microprocessor as recited in claim 1, wherein the bus comprises a plurality of point-to-point lines coupling each to decoder to at least two neighboring decoders.

15. A method for decoding instructions in parallel in a microprocessor, the method comprising:
   reading a plurality of instruction bytes from an instruction cache;

routing each instruction byte to one of a plurality of decoders;

detecting instruction boundaries;

executing simple instructions within the plurality of decoders; and forwarding complex instructions to reservation stations for eventual execution by functional units.

16. The method as recited in claim 15, further comprising detecting simple instructions, wherein simple instructions are instructions that do not have dependencies upon unexecuted instructions and that do not alter the microprocessor's state.

17. The method as recited in claim 15, further comprising conveying control signals from one decoder to another, wherein the control signals are indicative of the function of the particular instruction byte being decoded by each particular decoder.

18. The method as recited in claim 15, further comprising:

allocating a reorder buffer entry for each instruction that is decoded, and storing the results of executed simple instructions into the corresponding allocated entry.

19. A computer system comprising:

a first microprocessor;

a CPU bus coupled to said first microprocessor; and a modem coupled to said CPU bus, wherein said first microprocessor comprises:

an instruction cache configured to receive and store instruction bytes;

a plurality of decode units, wherein each decode unit is configured to receive at least one instruction byte from the instruction cache; and a bus coupling the decode units, wherein the decode units are each configured to cross talk to identify the boundaries of instructions formed by the instruction bytes, and wherein the decode units are configured to detect and execute simple instructions.

20. The computer system are recited in claim 19, further comprising a second microprocessor coupled to said first microprocessor via said CPU bus.

* * * * *